United States Patent
Bang et al.

(10) Patent No.: US 9,496,537 B2
(45) Date of Patent: Nov. 15, 2016

(54) HIGH-OUTPUT, LARGE-CAPACITY BATTERY PACK

(75) Inventors: Seunghyun Bang, Cheongwon-gun (KR); Sooryoung Kim, Cheongwon-gun (KR); Bum Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 133 days.

(21) Appl. No.: 13/808,287

(22) PCT Filed: Sep. 2, 2011

(86) PCT No.: PCT/KR2011/006535
§ 371 (c)(1),
(2), (4) Date: May 16, 2013

(87) PCT Pub. No.: WO2012/033313
PCT Pub. Date: Mar. 15, 2012

(65) Prior Publication Data
US 2013/0236769 A1    Sep. 12, 2013

(30) Foreign Application Priority Data
Sep. 7, 2010   (KR) .................. 10-2010-0087270

(51) Int. Cl.
H01M 2/22     (2006.01)
H01M 2/10     (2006.01)
(Continued)

(52) U.S. Cl.
CPC .............. *H01M 2/22* (2013.01); *B23K 11/004* (2013.01); *H01M 2/105* (2013.01); *H01M 2/202* (2013.01); *H01M 2/204* (2013.01); *H01M 2/206* (2013.01); *H01M 2/30* (2013.01); *H01M 2220/20* (2013.01)

(58) Field of Classification Search
USPC .......................................... 429/159, 160–177
See application file for complete search history.

(56) References Cited

U.S. PATENT DOCUMENTS 4,203,019 A     5/1980  Richter et al.
5,756,227 A  *  5/1998  Suzuki ..................... F28F 3/02
                                                          429/120
(Continued)

FOREIGN PATENT DOCUMENTS

CN       101728591 A     6/2010
GB       1 449 983       9/1976
(Continued)

OTHER PUBLICATIONS

International Search Report issued in PCT/KR2011/006535, mailed on Apr. 27, 2012.
(Continued)

*Primary Examiner* — Ula C Ruddock
*Assistant Examiner* — Osei Amponsah
(74) *Attorney, Agent, or Firm* — Birch, Stewart, Kolasch & Birch, LLP

(57) ABSTRACT

Disclosed herein is a battery pack having a plurality of unit cells electrically connected to each other to provide high-output, large-capacity electricity, the battery pack including two or more unit cells each of which has electrode terminals formed at opposite ends thereof, the unit cells being disposed in a lateral direction so that the electrode terminals are oriented in the same directions, connection members, each of which comprises a first conductive plate-shaped connection part connected to the electrode terminals of the unit cells by welding and a second plate-shaped connection part coupled to the outside of the first plate-shaped connection part, the second plate-shaped connection part being provided with through holes, into which a welding rod is inserted to weld the battery cells and the first plate-shaped connection part, and a pack case to cover the outsides of the unit cells and the connection members.

14 Claims, 5 Drawing Sheets

(51) Int. Cl.
  *H01M 2/20*   (2006.01)
  *H01M 2/30*   (2006.01)
  *B23K 11/00*  (2006.01)

(56) References Cited

U.S. PATENT DOCUMENTS

| | | | |
|---|---|---|---|
| 6,602,080 B1* | 8/2003 | Gu | H01M 2/1044 429/100 |
| 2004/0247999 A1* | 12/2004 | Shirane et al. | 429/161 |
| 2005/0079408 A1 | 4/2005 | Hirano | |
| 2006/0032667 A1 | 2/2006 | Sato | |
| 2007/0072066 A1* | 3/2007 | Yoon et al. | 429/99 |
| 2009/0136840 A1* | 5/2009 | Kim | 429/163 |
| 2009/0291329 A1 | 11/2009 | Kondou et al. | |
| 2010/0266880 A1 | 10/2010 | Hirakawa et al. | |
| 2011/0086255 A1* | 4/2011 | Maxwell | H01M 2/105 429/96 |

FOREIGN PATENT DOCUMENTS

| | | | | |
|---|---|---|---|---|
| GB | 2 458 943 A | | 10/2009 | |
| GB | 2458943 A | * | 10/2009 | H01M 2/26 |
| JP | 2003-162993 A | | 6/2003 | |
| JP | 2009-146606 A | | 7/2009 | |
| JP | 2009-176689 | * | 8/2009 | H01M 10/50 |
| JP | 2009-211907 A | | 9/2009 | |
| JP | 2009-230864 A | | 10/2009 | |

OTHER PUBLICATIONS

European Search Report dated Jan. 12, 2015.

\* cited by examiner

HIGH-OUTPUT, LARGE-CAPACITY BATTERY PACK

TECHNICAL FIELD

The present invention relates to a high-output, large-capacity battery pack, and, more particularly, to a battery pack having a plurality of unit cells electrically connected to each other to provide high-output, large-capacity electricity, the battery pack including two or more unit cells each of which has electrode terminals formed at opposite ends thereof, the unit cells being disposed in a lateral direction so that the electrode terminals are oriented in the same directions, connection members, each of which comprises a first conductive plate-shaped connection part connected to the electrode terminals of the unit cells by welding and a second plate-shaped connection part coupled to the outside of the first plate-shaped connection part, the second plate-shaped connection part being provided with through holes, into which a welding rod is inserted to weld the battery cells and the first plate-shaped connection part, and a pack case to cover the outsides of the unit cells and the connection members.

BACKGROUND ART

As mobile devices have been increasingly developed, and the demand for such mobile devices has increased, the demand for secondary batteries as an energy source has also sharply increased.

Depending upon kinds of external devices in which such secondary batteries are used, the secondary batteries may be used in the form of a single battery or in the form of a battery pack having a plurality of unit cells electrically connected to each other. For example, small-sized devices, such as mobile phones, can be operated for a predetermined period of time with the output and capacity of one battery. On the other hand, a battery pack needs to be used in middle or large-sized devices, such as laptop computers, portable digital versatile disc (DVD) players, small-sized personal computers (PCs), electric vehicles and hybrid electric vehicles, because high output and large capacity are necessary for such middle or large-sized devices.

Such a battery pack is manufactured by connecting a protection circuit to a core pack having a plurality of unit cells connected in series and/or in parallel to each other. In a case in which prismatic or pouch-shaped batteries are used as the unit cells, the prismatic or pouch-shaped batteries are stacked so that large-sized surfaces of the prismatic or pouch-shaped batteries face each other, and then electrode terminals of the prismatic or pouch-shaped batteries are connected to each other by connection members. In a case in which a three-dimensional secondary battery pack having a hexahedral structure is to be manufactured, therefore, the prismatic or pouch-shaped batteries are preferably used as unit cells of the battery pack.

On the other hand, cylindrical batteries generally have larger electric capacities than the prismatic or pouch-shaped batteries. However, it is difficult to arrange the cylindrical batteries so that the cylindrical batteries have a stacked structure due to the external shape of the cylindrical batteries. In a case in which a battery pack is generally configured to have a line type structure or in a plane type structure, though, the cylindrical batteries are structurally more advantageous than the prismatic or pouch-shaped batteries.

Specifically, parallel-connection of cylindrical battery cells in a large-capacity battery pack is typically shown in FIG. 1, and thicknesses of a case of one of the cylindrical battery cells and a connection member are typically shown in a partial view of FIG. 2.

Referring to these drawings, cylindrical battery cells 10 are disposed so that electrode terminals 150 of the battery cells 10 having the same polarities are oriented in the same directions, and long bar type connection members 20 are connected to the electrode terminals 15 of the battery cells 10 having the same polarities by welding so that the battery cells 10 are connected in parallel with each other.

The case of each of the cylindrical battery cells 10 has a thickness t of approximately 0.2 mm. High current of 50 A or more flows in the connection members 20, by which the cylindrical battery cells 10 are connected in parallel to each other. For this reason, it is necessary for each of the connection members to have a thickness T of approximately 3 mm based on electrical or structural connection thereof.

In a case in which the connection members are connected to the cases of the respective cylindrical battery cells by welding, however, resistance difference occurs as the difference in thickness between the case of each of the cylindrical battery cells and each of the connection members increases with the result that it is difficult to connect the connection members to the cases of the respective cylindrical battery cells by resistance welding Consequently, there is a high necessity for a high-output, large-capacity battery pack wherein contact resistance is minimized while manufacturing efficiency is improved.

DISCLOSURE

Technical Problem

Therefore, the present invention has been made to solve the above problems, and other technical problems that have yet to be resolved.

It is an object of the present invention to provide a battery pack wherein unit cells are safely electrically connected to each other using connection members configured to have a novel structure, thereby improving manufacturing efficiency.

Technical Solution

In accordance with one aspect of the present invention, the above and other objects can be accomplished by the provision of a battery pack having a plurality of unit cells electrically connected to each other to provide high-output, large-capacity electricity, the battery pack including two or more unit cells each of which has electrode terminals formed at opposite ends thereof, the unit cells being disposed in a lateral direction so that the electrode terminals are oriented in the same directions, connection members, each of which comprises a first conductive plate-shaped connection part connected to the electrode terminals of the unit cells by welding and a second plate-shaped connection part coupled to the outside of the first plate-shaped connection part, the second plate-shaped connection part being provided with through holes, into which a welding rod is inserted to weld the battery cells and the first plate-shaped connection part, and a pack case to cover the outsides of the unit cells and the connection members.

That is, each of the connection members according to the present invention includes the first plate-shaped connection part and the second plate-shaped connection part configured to have the specific structures as described above. Consequently, it is possible to easily perform resistance welding and to greatly improve safety of the battery pack against generation of heat from the connection members by the provision of the first conductive plate-shaped connection part connected to the electrode terminals of the unit cells.

Each of the unit cells may be a secondary cell that is repeatedly charged and discharged. Each of the unit cells may be a prismatic battery cell or a cylindrical battery cell. Preferably, each of the unit cells is a cylindrical battery cell.

Connection of the unit cells is not particularly restricted so long as the unit cells are connected to have a structure that is capable of providing high-output, large-capacity electricity. For example, the unit cells may be connected in parallel, in series or in parallel and series to each other. The number of the unit cells is not particularly restricted. For example, the number of the unit cells may be 5 to 20.

In a concrete example, the unit cells may be connected in parallel to each other, electrode terminals of the battery cells having the same polarities may be oriented in the same directions, and a pair of connection members may be connected to cathodes and anodes of the battery cells, respectively.

In another concrete example, the unit cells may be connected in series to each other, electrode terminals of the battery cells having different polarities may be alternately oriented, and the connection members may be connected to series-connection regions of the unit cells, respectively.

Also, the unit cells may be connected in parallel and series to each other, two or more unit cells may be connected in parallel to each other to form a bank, electrode terminals of the unit cells having different polarities may be alternately oriented so that banks are connected in series to each other, and the connection members may be connected to parallel-connection regions and series-connection regions of the banks.

In the above structure, the parallel-connection of the unit cells in each of the banks and the series-connection between neighboring banks may be achieved, preferably, by one of the connection members.

Consequently, it is possible to configure a high-output, large-capacity battery pack wherein unit cells are connected to each other in various forms by the provision of the connection members according to the present invention.

The connection members may be made of various materials, such as nickel, copper, lead and an alloy of nickel and aluminum. Preferably, the second plate-shaped connection part is made of a material exhibiting low resistance necessary to connect a plurality of unit cells to each other. For example, the second plate-shaped connection part may be made of a copper material.

The first plate-shaped connection part connected to the electrode terminals of the unit cells together with the second plate-shaped connection part may be made of various materials. Preferably, the first plate-shaped connection part is made of a nickel material.

In a case in which the thickness of each of the connection members is much the same as the thickness of the case of each of the unit cells, connection between the unit cells and the connection member by resistance welding is easily achieved. In a case in which a plurality of unit cells is connected to each other so as to constitute a battery pack, however, the connection members may be easily cut by heat generated due to the sectional area and resistance of the material. For this reason, it is necessary to increase the thickness of each of the connection members.

Consequently, the first plate-shaped connection part connected to the electrode terminals of the unit cells is formed to have a thickness equivalent to 5 to 50% of the thickness of the second plate-shaped connection part, and therefore, it is possible to easily achieve connection between the first plate-shaped connection part and the electrode terminals of the unit cells by welding.

Preferably, the second plate-shaped connection part has a thickness of approximately 0.5 to 20 mm. In this case, the sectional area of each of the connection members is increased, and therefore, it is possible to effectively reduce internal resistance of the connection members and heat generated during electrical conduction of the connection members.

That is, the first plate-shaped connection part connected to the electrode terminals of the unit cells preferably has a thickness much the same as the thickness of a case of each of the unit cells. More preferably, the first plate-shaped connection part has a thickness of approximately 0.1 to 0.5 mm Consequently, it is possible to easily connect the unit cells of the battery pack to each other while minimizing contact resistance.

In a preferred example, the first plate-shaped connection part and the second plate-shaped connection part may be coupled to each other using various coupling methods. For example, the first plate-shaped connection part and the second plate-shaped connection part may be coupled to each other by cream soldering, ultrasonic welding or laser welding.

In a concrete example, the first plate-shaped connection part and the second plate-shaped connection part may be coupled to each other by cream soldering, and solder paste may be disposed between the first plate-shaped connection part and the second plate-shaped connection part to achieve cream soldering. Also, the solder paste may be provided with openings formed at positions corresponding to the through holes of the second plate-shaped connection part. Consequently, a manufacturing process is simplified, and therefore, it is possible to easily automate the manufacturing process.

Meanwhile, the connection members may be coupled to the electrode terminals of the unit cells using various welding methods. For example, the connection members may be coupled to the electrode terminals of the unit cells by resistance welding, laser welding or ultrasonic welding.

In another preferred example, the second plate-shaped connection part may be provided at one end thereof with an input and output terminal, through which the battery pack is connected to an external device.

In the above structure, the end of the second plate-shaped connection part, at which the input and output terminal is formed, is bent toward an outermost one of the unit cells with the result that the battery pack has a compact structure.

Preferably, the pack case is made of an insulative plastic material or a metal material, such as aluminum. In a case in which the pack case is made of the plastic material, the material for the pack case is not particularly restricted. For example, the pack case may be made of a polyolefin resin, such as polypropylene, a polystyrene resin, a polycarbonate resin, an acrylonitrile butadiene styrene (ABS) resin, a rubber resin, or an aramid-based resin, such as Nomax. In a case in which the pack case is made of the metal material, the inside of the pack case is preferably coated with an insulative film.

In consideration of installation efficiency and structural stability of the battery pack according to the present invention depending upon desired output and capacity of the battery pack, the battery pack is preferably used as a power source for electric vehicles, hybrid electric vehicles, electric motorcycles or electric bicycles.

In particular, the battery pack configured to have the above structure is compact, and therefore, it is possible to use the battery pack as an energy storage system or an uninterruptible power supply (UPS) installed in a relay station of a communication company to supply power in case of emergency.

EFFECTS OF THE INVENTION

As is apparent from the above description, the battery pack according to the present invention is configured so that a pair of connection members, each of which includes a first plate-shaped connection part and a second plate-shaped connection part, cover electrode terminals of unit cells. Consequently, it is possible to easily perform welding while improving manufacturing efficiency of the battery pack, thereby improving safety of the battery pack.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
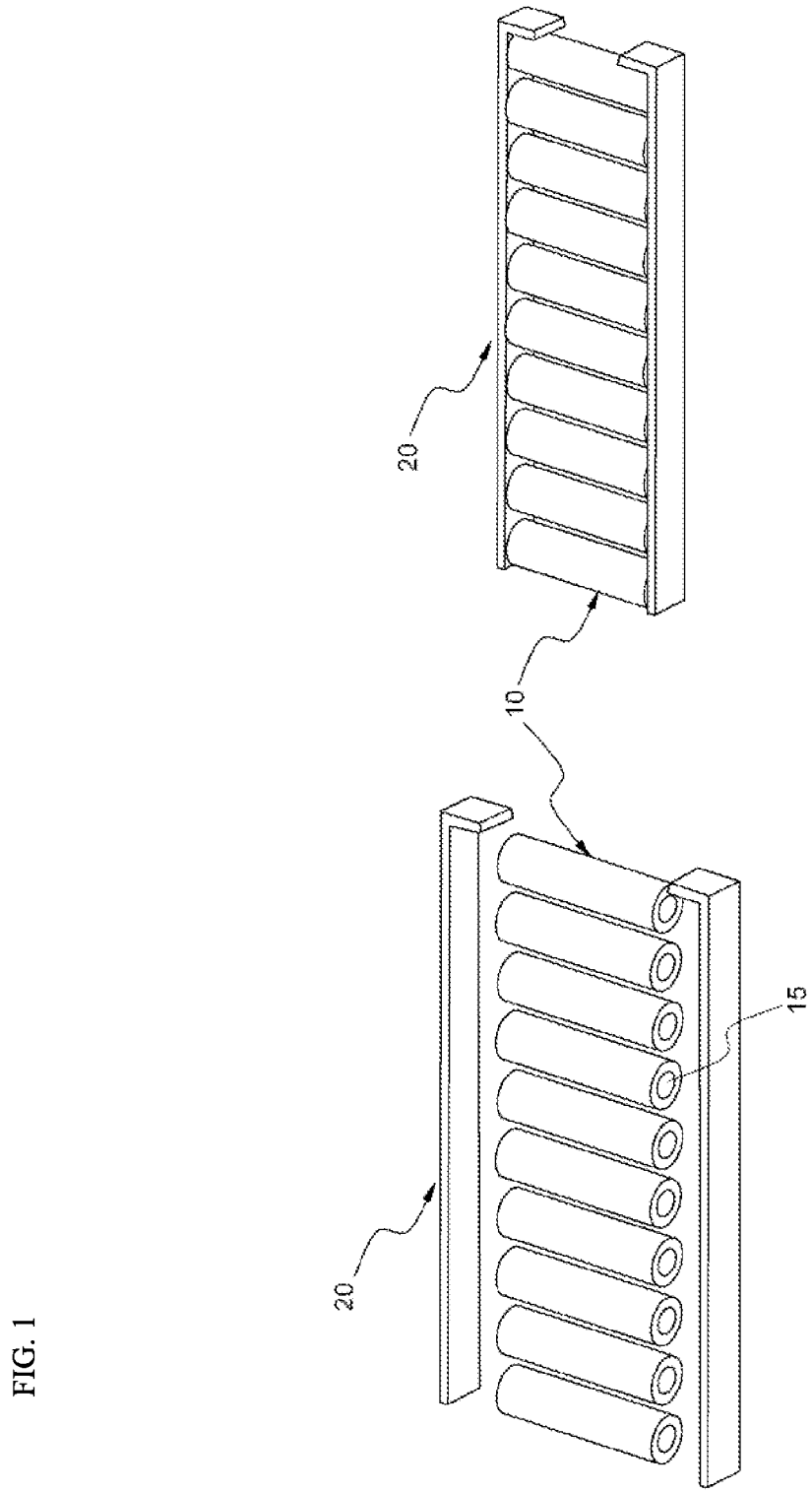
FIG. 1 is a typical view and an exploded view showing unit cells and conventional connection members.
Figure 2:
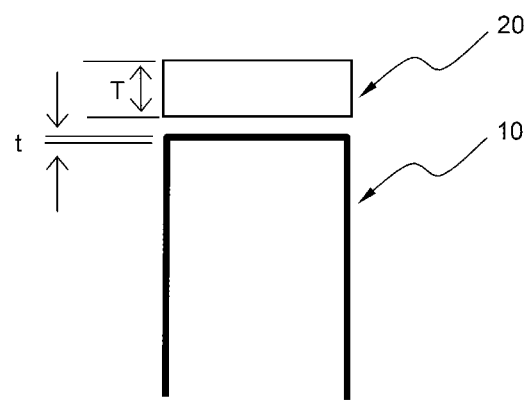
FIG. 2 is a partial sectional view showing one of the unit cells and one of the connection members shown in FIG. 1.
Figure 3:
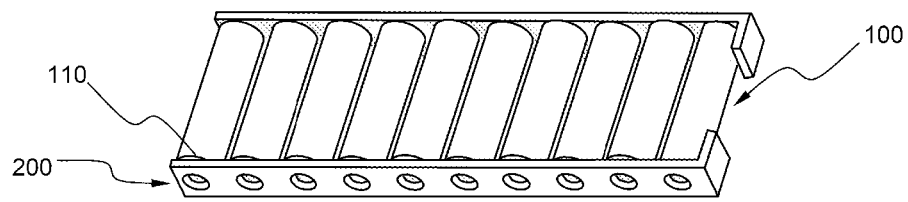
FIG. 3 is a typical view showing unit cells and connection members according to an embodiment of the present invention.

FIG. 3 is a typical view showing unit cells and a pair of connection members according to an embodiment of the present invention.

Referring to FIG. 3, ten cylindrical battery cells 100 are disposed so that electrode terminals 110 of the battery cells 100 having the same polarities are oriented in the same directions, and conductive connection members 200 are connected to the corresponding electrode terminals 110 of the battery cells 100 by resistance welding so that the battery cells 100 are connected in parallel with each other to provide high-output, large-capacity electricity.

Figure 4:
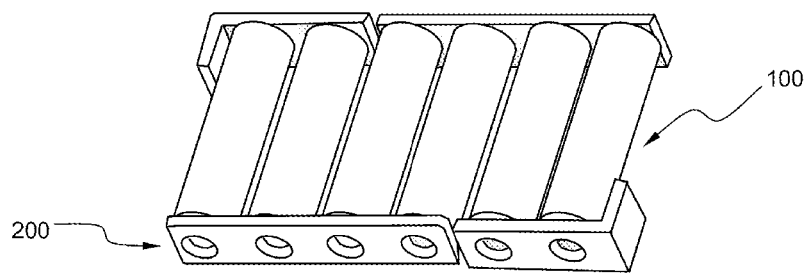
FIG. 4 is a typical view showing unit cells and connection members according to another embodiment of the present invention.
Figure 5:
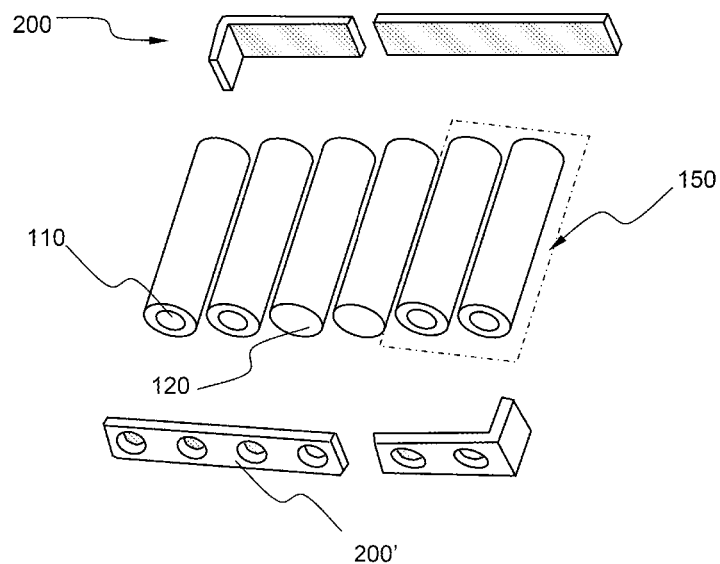
FIG. 5 is an exploded view of FIG. 4.

FIG. 4 is a typical view showing unit cells and connection members according to another embodiment of the present invention, and FIG. 5 is an exploded view of FIG. 4.

Referring to these drawings, two cylindrical battery cells 100 are connected in parallel to each other to form a bank 150. Electrode terminals 110 and 120 having different polarities are alternately oriented so that three banks 150 are connected in series to each other. Consequently, six cylindrical battery cells 100 are connected in parallel and in series to each other.

Also, each connection member 200' is connected to a parallel-connection region of the cylindrical battery cells 100 and a series-connection region of a neighboring bank.

Figure 6:
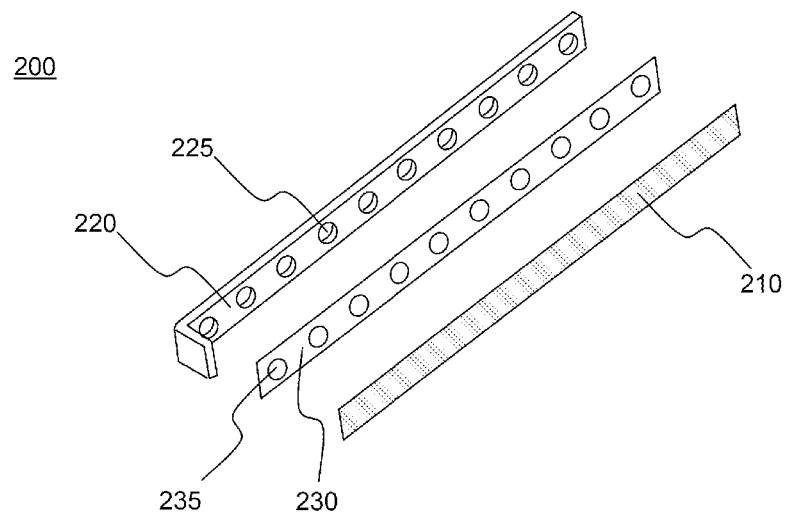
FIG. 6 is an exploded view showing one of the connection members shown in FIG. 3.
Figure 7:
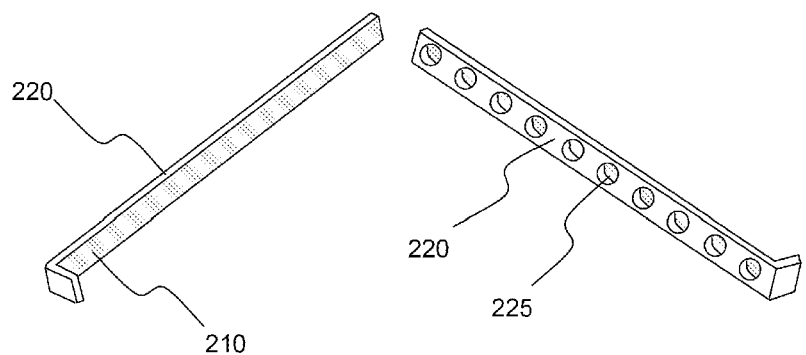
FIG. 7 is a front typical view and a rear typical view showing one of the connection members shown in FIG. 3.
Figure 8:
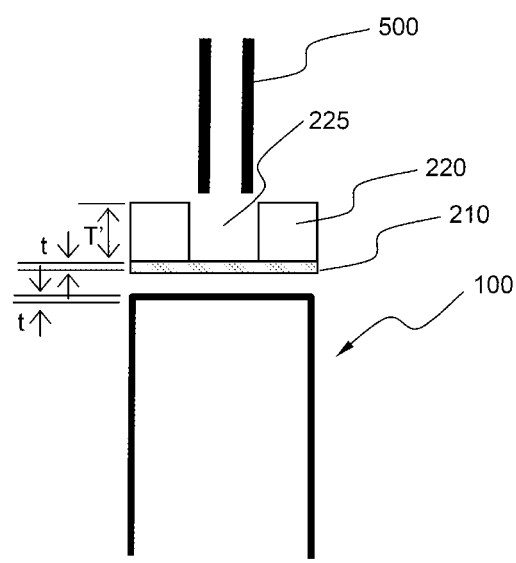
FIG. 8 is a partial sectional view showing one of the unit cells and one of the connection members of FIG. 3.

FIG. 6 is an exploded view typically showing one of the connection members shown in FIG. 3, FIG. 7 is a front typical view and a rear typical view showing one of the connection members shown in FIG. 3, and FIG. 8 is a partial sectional view typically showing one of the unit cells and one of the connection members of FIG. 3.

Referring to these drawings together with FIG. 3, each of the connection members 200 includes a first conductive plate-shaped connection part 210 connected to the electrode terminals 110 of the cylindrical battery cells 100 by welding and a second plate-shaped connection part 220 coupled to the outside of the first plate-shaped connection part 210. The second plate-shaped connection part 220 is provided with through holes 225, into which a welding rod 500 is inserted to weld the battery cells 100 and the first plate-shaped connection part 210.

The first plate-shaped connection part 210 is made of a nickel plate. The first plate-shaped connection part 210 has a thickness t of 0.2 mm, which is much the same as the thickness t of a case constituting each of the cylindrical battery cells 100, to minimize contact resistance.

The second plate-shaped connection part 220 is made of a copper material, which exhibits low resistance. Consequently, the cylindrical battery cells 100 can be easily connected to the second plate-shaped connection part 220. Also, the second plate-shaped connection part 220 has a thickness T' of 2 mm. Consequently, the sectional area of the connection member 200 is increased, and therefore, it is possible to effectively reduce heat generated during electrical conduction of the connection member 200.

Between the first plate-shaped connection part 210 and the second plate-shaped connection part 220 is disposed solder paste 230 used to achieve cream soldering. The solder paste 230 is provided with openings 235 formed at positions corresponding to the through holes of the second plate-shaped connection part 220.

For information, the length of the connection members may be varied based on the number of the cylindrical battery cells like the connection members shown in FIG. 4. The connection members shown in FIG. 4 are identical in basic construction to the connection members shown in FIG. 3, and therefore, a detailed description thereof will be omitted.

Figure 9:
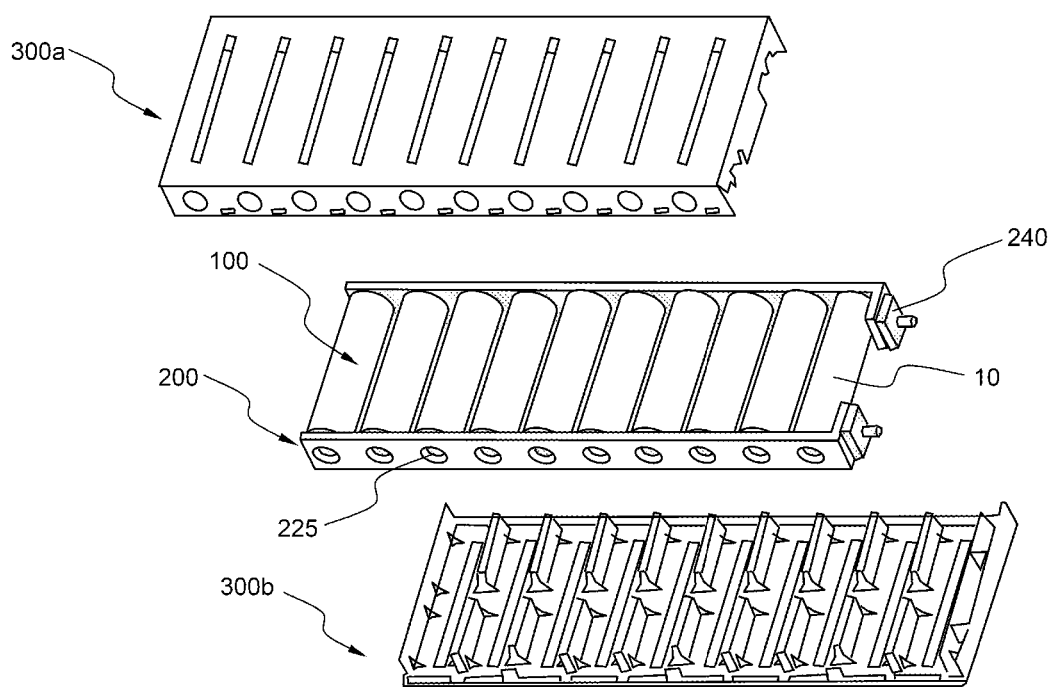
FIG. 9 is an exploded view showing a battery pack according to an embodiment of the present invention.
Figure 10:
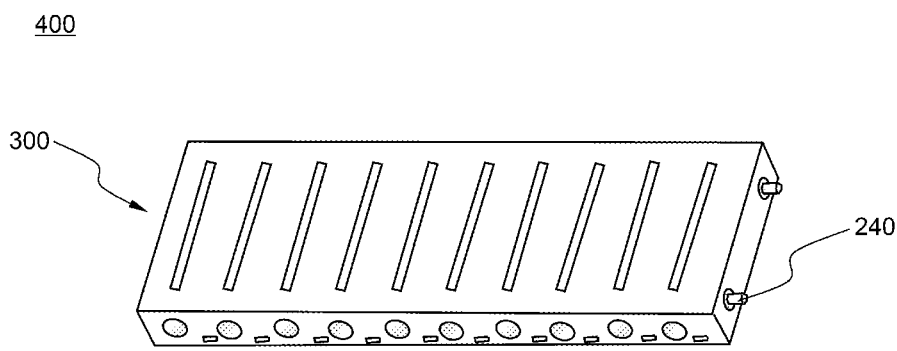
FIG. 10 is a typical view of the battery pack shown in FIG. 9.

FIG. 9 is an exploded view showing a battery pack according to an embodiment of the present invention, and FIG. 10 is a typical view of the battery pack shown in FIG. 9.

Referring to these drawings together with FIG. 7, a battery pack 400 includes a pack case 300, made of a plastic material, to cover a plurality of cylindrical battery cells 100 and 101 and connection members 200. The pack case 300 may include an upper case 300a and a lower case 300b as needed.

An input and output terminal 240, through which the battery pack is connected to an external device (not shown), is formed at one end of each of the second plate-shaped connection parts 220. The end of each of the second plate-shaped connection parts 220, at which the input and output terminal 240 is formed, is bent toward the outermost unit cell 101 so that the battery pack has a compact structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack having a plurality of unit cells electrically connected to each other, the battery pack comprising:
   two or more unit cells each of which has electrode terminals formed at opposite ends thereof, the unit cells being disposed in a lateral direction so that the electrode terminals are oriented in the same direction;
   connection members, each of which comprises a first conductive plate-shaped connection part connected to the electrode terminals of the unit cells by welding and a second plate-shaped connection part coupled to the outside of the first plate-shaped connection part, the second plate-shaped connection part being provided with through holes, into which a welding rod is inserted to weld the unit cells and the first plate-shaped connection part; and
   a pack case to cover the outsides of the unit cells and the connection members,
   wherein each of the through holes is formed at positions corresponding to the positions in which the unit cells and the first plate-shaped connection part are welded,
   wherein the first conductive plate-shaped connection part and the second plate-shaped connection part are coupled to each other by cream soldering, and a solder paste is disposed between the first conductive plate-shaped connection part and the second plate-shaped connection part to achieve the cream soldering, and the solder paste is provided with openings formed at positions corresponding to the through holes of the second plate-shaped connection part,
   wherein the second plate-shaped connection part is made of a copper material,
   wherein the first plate-shaped connection part is made of a nickel plate, and
   wherein the second plate-shaped connection part has one end and an input and output terminal formed on said one end such that the battery pack is connected to an external device through the input and output terminal,
   wherein the end of the second plate-shaped connection part, at which the input and output terminal is formed, is bent toward an outermost one of the unit cells.

2. The battery pack according to claim 1, wherein each of the unit cells is a cylindrical battery cell.

3. The battery pack according to claim 1, wherein the unit cells are connected in parallel, or in series, or in parallel and series to each other.

4. The battery pack according to claim 1, wherein the unit cells are connected in parallel to each other, electrode terminals of the unit cells having the same polarities are oriented in the same directions, and a pair of connection members is connected to cathodes and anodes of the unit cells, respectively.

5. The battery pack according to claim 1, wherein the unit cells are connected in series to each other, electrode terminals of the battery cells having different polarities are alternately oriented, and the connection members are connected to series-connection regions of the unit cells, respectively.

6. The battery pack according to claim 3, wherein the unit cells are connected in parallel and series to each other, two or more unit cells are connected in parallel to each other to form a bank, electrode terminals of the unit cells having different polarities are alternately oriented so that banks are connected in series to each other, and the connection members are connected to parallel-connection regions and series-connection regions of the banks.

7. The battery pack according to claim 6, wherein the parallel-connection of the unit cells in each of the banks and the series-connection between neighboring banks are achieved by one of the connection members.

8. The battery pack according to claim 1, wherein the first plate-shaped connection part has a thickness equivalent to 5 to 50% of the thickness of the second plate-shaped connection part.

9. The battery pack according to claim 1, wherein the second plate-shaped connection part has a thickness of 0.5 to 20 mm.

10. The battery pack according to claim 1, wherein the first plate-shaped connection part has a thickness much the same as the thickness of a case of each of the unit cells.

11. The battery pack according to claim 1, wherein the first plate-shaped connection part has a thickness of 0.1 to 0.5 mm.

12. The battery pack according to claim 1, wherein the connection members are coupled to the electrode terminals of the unit cells by resistance welding, laser welding or ultrasonic welding.

13. The battery pack according to claim 1, wherein the pack case is made of an insulative plastic material or a metal material.

14. The battery pack according to claim 1, wherein the battery pack is used as a power source for electric vehicles, hybrid electric vehicles, electric motorcycles or electric bicycles, an energy storage system or an uninterruptible power supply (UPS).

* * * * *